US012666464B2

(12) United States Patent　　(10) Patent No.: US 12,666,464 B2

Mallat　　(45) Date of Patent: Jun. 23, 2026

(54) OPTIMIZED SENSOR NETWORKS USING BLUETOOTH

(71) Applicant: Silicon Laboratories Inc., Austin, TX (US)

(72) Inventor: Hannu Mallat, Espoo (FI)

(73) Assignee: Silicon Laboratories Inc., Austin, TX (US)

( * ) Notice: Subject to any disclaimer, the term of this patent is extended or adjusted under 35 U.S.C. 154(b) by 430 days.

(21) Appl. No.: 18/302,277

(22) Filed: Apr. 18, 2023

(65) Prior Publication Data

US 2024/0357646 A1　　Oct. 24, 2024

(51) Int. Cl.
| | |
|---|---|
| *H04W 28/06* | (2009.01) |
| *H04W 4/38* | (2018.01) |
| *H04W 4/80* | (2018.01) |
| *H04W 74/0816* | (2024.01) |
| *H04W 84/18* | (2009.01) |

(52) U.S. Cl.
CPC ......... *H04W 74/0816* (2013.01); *H04W 4/38* (2018.02); *H04W 4/80* (2018.02); *H04W 28/06* (2013.01); *H04W 84/18* (2013.01)

(58) Field of Classification Search
CPC ........ H04L 67/12; H04W 84/18; H04W 4/38; H04W 74/06; H04W 74/04
See application file for complete search history.

(56) References Cited

U.S. PATENT DOCUMENTS

| | | | | |
|---|---|---|---|---|
| 9,940,826 | B1 * | 4/2018 | Divakara | G08B 29/188 |
| 2007/0167181 | A1 * | 7/2007 | Ramesh | H04W 48/10 |
| | | | | 455/553.1 |
| 2009/0066722 | A1 * | 3/2009 | Kriger | G09B 17/00 |
| | | | | 345/619 |
| 2010/0302987 | A1 * | 12/2010 | Sawahashi | H04W 72/30 |
| | | | | 370/312 |
| 2017/0279808 | A1 * | 9/2017 | Kwon | H04W 76/10 |
| 2017/0352260 | A1 * | 12/2017 | Saito | H04L 12/40169 |
| 2019/0044911 | A1 * | 2/2019 | Matsumoto | H04W 80/04 |
| 2020/0036792 | A1 * | 1/2020 | Palin | H04W 4/80 |
| 2020/0145880 | A1 * | 5/2020 | Kubo | H04W 84/18 |
| 2021/0266894 | A1 * | 8/2021 | Andresky | H04W 72/0446 |
| 2021/0288764 | A1 * | 9/2021 | Linsky | H04L 1/1864 |
| 2022/0116711 | A1 * | 4/2022 | Haggai | H04R 5/04 |
| 2022/0345856 | A1 * | 10/2022 | Frye | H04W 4/40 |
| 2024/0048539 | A1 * | 2/2024 | Nguyen | H04L 9/14 |
| 2024/0259895 | A1 * | 8/2024 | Prasad | H04W 36/0072 |
| 2024/0260093 | A1 * | 8/2024 | Gu | H04W 74/00 |
| 2024/0267905 | A1 * | 8/2024 | Robin | H04W 52/143 |

(Continued)

*Primary Examiner* — Jason D Cardone

(74) *Attorney, Agent, or Firm* — Nields, Lemack & Frame, LLC

(57) ABSTRACT

A system and method for reducing the probability of collisions in a Bluetooth wireless sensor network is disclosed. The system and method utilize Periodic Advertising with Response to receive status information from the plurality of wireless sensor devices. Therefore, rather than sending the Sensor Status message at random times, the wireless sensor devices are all assigned a response slot in one of the subevents. The relay device receives all of the sensor status messages and forwards the information to the next hop device using measurement collection packets. In some embodiments, the relay device compacts the information before transmitting the measurement collection packets.

18 Claims, 6 Drawing Sheets

(56)         References Cited

U.S. PATENT DOCUMENTS

| | | | | |
|---|---|---|---|---|
| 2024/0276304 A1* | 8/2024 | Rangineni | ............. | H04W 28/18 |
| 2024/0306105 A1* | 9/2024 | Rangineni | ........... | H04W 56/001 |
| 2024/0323809 A1* | 9/2024 | Stationwala | ........ | H04W 56/001 |
| 2024/0340665 A1* | 10/2024 | Narula | .................... | H04W 4/38 |

* cited by examiner

OPTIMIZED SENSOR NETWORKS USING BLUETOOTH

FIELD

This disclosure describes a system and method to optimize communications in a wireless sensor network using a Bluetooth protocol.

BACKGROUND

The Bluetooth protocol is one of many wireless network protocols that are currently in use. The Bluetooth protocol is commonly used to connect smartphones to watches, headphones, speakers, and other accessories. Bluetooth Low Energy utilizes 40 physical channels in the 2.4 GHZ ISM band, each channel separated by 2 MHz.

The Bluetooth protocol may be used with sensor devices to measure some parameter, which may be temperature, humidity, light, movement, radio waves or others. In some embodiments, there may be multiple sensors that are arranged in a predetermined configuration to measure the parameter. In certain scenarios, it may be beneficial to utilize the Bluetooth mesh protocol for this sensor network. The Bluetooth Mesh protocol provides good wireless range, low latency, and relatively low power consumption of the sensor devices.

There are drawbacks to using Bluetooth Mesh. One drawback is that Bluetooth Mesh transmitters do not make use of any collision detection or collision avoidance techniques, such as appropriate timing of transmissions or RF sensing. This leads to packet loss when two nearby transmitters are transmitting at the same time. The typical remedy for such packet loss is to repeat transmissions with randomized delay intervals, which works well when there are a limited number of transmitters, but leads to congestion in dense networks and causes even greater packet loss. The problem is exacerbated by the fact that Bluetooth Mesh operates on the Bluetooth Low Energy advertising channels, which may have other traffic as well.

Therefore, it would be beneficial if there was a system and method that allowed for the transmission of data from sensor devices that incorporated collision avoidance.

SUMMARY

A system and method for reducing the probability of collisions in a Bluetooth wireless sensor network is disclosed. The system and method utilize Periodic Advertising with Response to receive status information from the plurality of wireless sensor devices. Therefore, rather than sending the Sensor Status message at random times, the wireless sensor devices are all assigned a response slot in one of the subevents. The relay device receives all of the Sensor Status messages and forwards the information to the next hop device using measurement collection packets. In some embodiments, the relay device compacts the information before transmitting the measurement collection packets.

According to one embodiment, a method of reducing data collisions in a Bluetooth wireless sensor network is disclosed. The Bluetooth wireless sensor network utilizes periodic advertisements with responses, wherein each of a plurality of wireless sensor devices in the Bluetooth wireless sensor network is assigned a response slot. The method comprises wirelessly transmitting, from a relay device, at least one subevent start packet; receiving, at the plurality of wireless sensor devices, the at least one subevent start packet; performing, at each of the plurality of wireless sensor devices, a measurement to obtain measurement data; transmitting measurement response packets from each of the plurality of wireless sensor devices to the relay device during a respective assigned response slot, wherein the measurement response packet contains the measurement data; and receiving, at the relay device, the measurement response packets from the plurality of wireless sensor devices.

In some embodiments, the method further comprises generating, at the relay device, one or more measurement collection packets using information from the measurement response packets; and transmitting the one or more measurement collection packets from the relay device to a next hop device.

In some embodiments, the at least one subevent start packet is an AUX_SYNC_SUBEVENT_IND PDU (protocol data unit). In some embodiments, the at least one subevent start packet includes an indication of the type of sensor data requested. In certain embodiments, the at least one subevent start packet includes a Sensor Get message. In some embodiments, the measurement response packet includes a Sensor Status message, contained within an AUX_SYNC_SUBEVENT_RSP PDU.

In some embodiments, the method further comprises compacting addresses of the wireless sensor devices, at the relay device, in the one or more measurement collection packets. In certain embodiments, compacting of the addresses comprises creating an array of addresses. In certain embodiments, compacting of the addresses comprises creating an address range.

In some embodiments, the measurement response packet includes a Sensor Status message, containing a format, a Property ID, a length and the measurement data, and the method further comprises compacting the measurement data received from the wireless sensor devices at the relay device, in the one or more measurement collection packets. In certain embodiments, compacting the measurement data comprises creating a data array, each element of the data array associated with one of the plurality of wireless sensor devices; wherein each element comprises the format, the Property ID, the length and the measurement data associated with a respect wireless sensor device. In certain embodiments, all Sensor Status messages have a same format, length and Property ID, and compacting the measurement data comprises creating a compacted data array, comprising a header including the format, the Property ID, the length and a data array comprising the measurement data from each wireless sensor device. In certain embodiments, all Sensor Status messages have a same format, length and Property ID, and wherein compacting the measurement data comprises creating a compacted data array, comprising a header including a bitlength and the Property ID, and a data array comprising the measurement data from each wireless sensor device.

According to another embodiment, a Bluetooth wireless sensor network is disclosed, wherein the Bluetooth wireless sensor network utilizes periodic advertisements with responses. The Bluetooth wireless sensor network comprises a plurality of wireless sensor devices; and a relay device; wherein the relay device transmits at least one subevent start packet; wherein each of the plurality wireless sensor devices receives the at least one subevent start packet, performs a measurement to obtain measurement data and transmits a measurement response packet to the relay device during a respective assigned response slot. In some embodiments, the Bluetooth wireless sensor network comprises a next hop device; wherein the relay device receives a plurality of measurement response packets from the plurality of wireless sensor devices, and transmits one or more measurement collection packets to the next hop device. In some embodiments, the relay device compacts addresses of the plurality of wireless sensor devices in the one or more measurement collection packets. In some embodiments, the relay device compacts the measurement data received from the wireless sensor devices in the one or more measurement collection packets. In certain embodiments, the measurement response packet includes a Sensor Status message, containing a format, a Property ID, a length and the measurement data, and wherein the relay device creates a compacted data array, comprising a header including the format, the Property ID, the length and a data array comprising the measurement data from each wireless sensor device. In certain embodiments, the measurement response packet includes a Sensor Status message, containing a format, a Property ID, a length and the measurement data, and wherein the relay device creates a compacted data array, comprising a header including a bitlength and the Property ID, and a data array comprising the measurement data from each wireless sensor device.

BRIEF DESCRIPTION OF THE DRAWINGS

For a better understanding of the present disclosure, reference is made to the accompanying drawings, in which like elements are referenced with like numerals, and in which.

DETAILED DESCRIPTION

This disclosure makes use of Periodic Advertisements with Responses (PAwR). This mode of communication allows a first device, referred to as the periodic advertiser, to broadcast to a plurality of listening devices, and allocates specific slots for each of the listening devices to respond to the periodic advertiser. Importantly, this mode of communication is connection-less, indicating that a connection does not need to be established between the periodic advertiser and each of the listening devices prior to the transmission of the periodic advertisement.

PAwR builds on the previously defined periodic advertisement in the sense that the first device, also referred to as the periodic advertiser, sends its data at given fixed intervals. The listening devices that listen to these periodic advertisements need only to synchronize themselves with the first device, such that these listening devices only need to listen at the time of the periodic transmission, not outside of it, to conserve power.

The transmission of this periodic advertisement occurs at regular intervals, referred to as the periodic advertising interval. These regular intervals may be multiples of 1.25 milliseconds, between 7.5 milliseconds and 81.91875 seconds. In this way, other network devices are able to enter a low power state and can wake up at predetermined times in order to receive the next periodic advertisement.

Figures 1A, 1B:
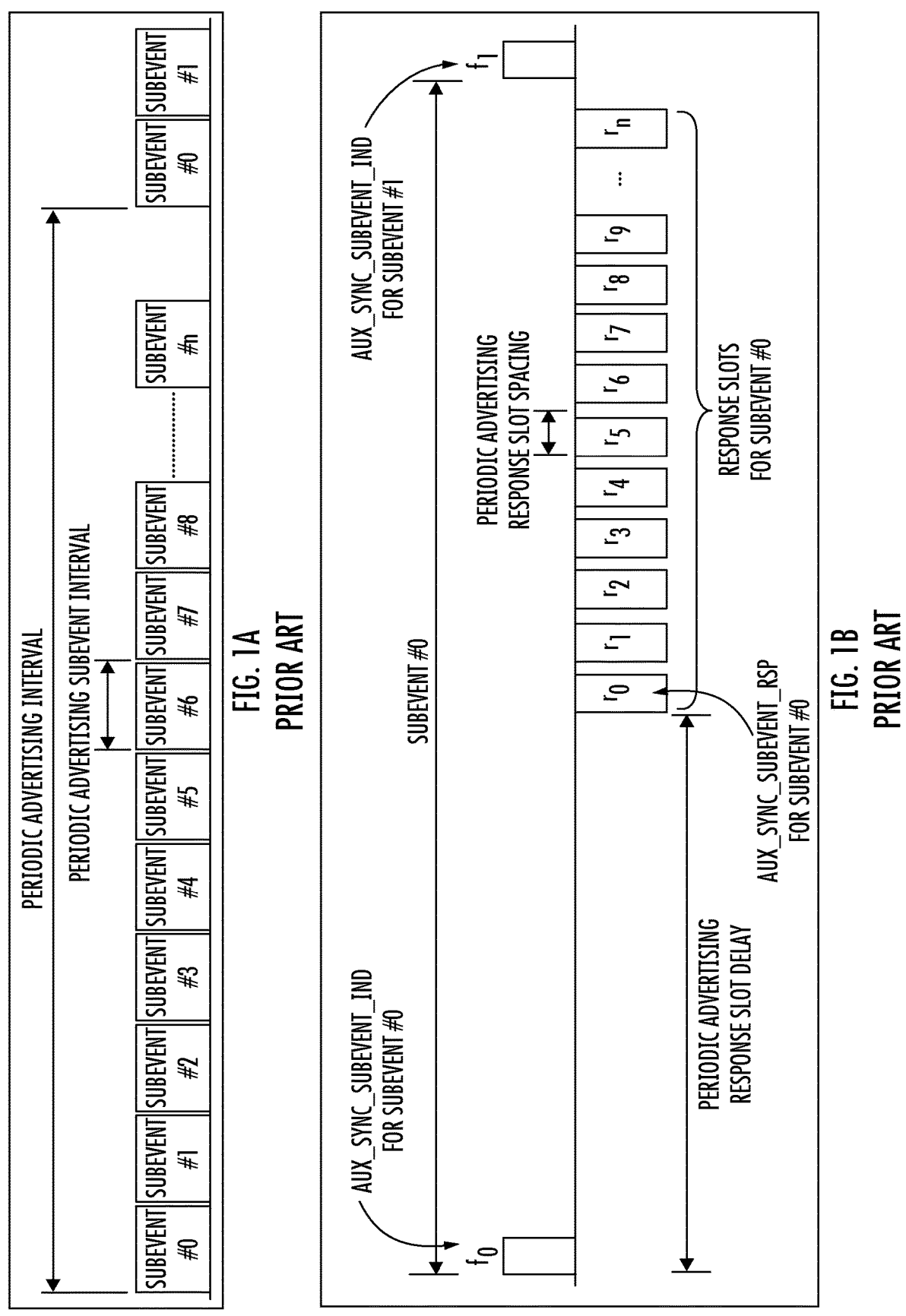
FIG. 1A shows a timing diagram showing a periodic advertising interval.
FIG. 1B shows an expanded view of one subevent during the periodic advertising interval.

As presented in the Bluetooth specification and shown in FIG. 1A, a PAwR event is repeated at every defined periodic advertising interval, and is divided into subevents. As defined in the Bluetooth specification and shown in FIG. 1B, each subevent includes an AUX_SYNC_SUBEVENT_IND protocol data unit (PDU), sent by the periodic advertiser, and one or more AUX_SYNC_SUBEVENT_RSP PDUs that are sent in response by the listening devices scanning for the periodic advertiser's transmissions.

Importantly, each listening device is allocated a separate timeslot in which to transmit its response PDU. This allows the listening devices to avoid collisions, making transmission of the responses more efficient than would be the case without a collision avoidance scheme.

The response timeslots are allocated to the listening devices by a higher layer protocol. Likewise, the subevent during which the listening device will respond is allocated by a higher layer protocol. This allows for a flexible arrangement of tradeoff between latency of communication and the number of listening devices taking part in the communication. Finally, the time between the AUX_SYNC_SUBEVENT_IND PDU and the start of the response slots is also defined by a higher level protocol.

The PAwR may be exploited in a sensor network that includes a plurality of sensor devices. A sensor network may be built as a Bluetooth Mesh network.

Figure 2A:
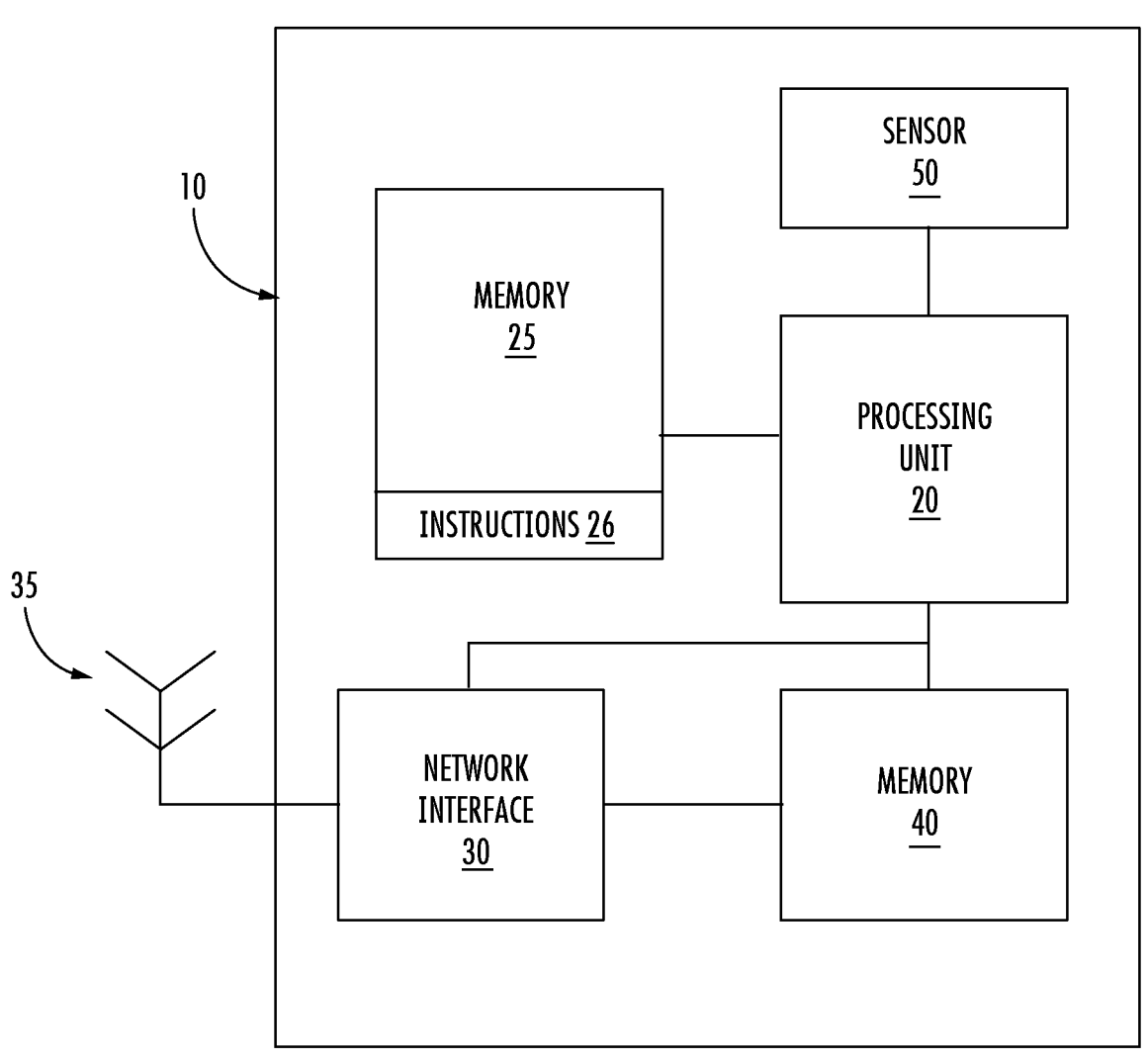
FIG. 2A shows a block diagram of a Bluetooth device according to one embodiment.

FIG. 2A shows a block diagram of a representative Bluetooth device 10 that may be used to implement the disclosed method of optimizing communications from sensor devices in a Bluetooth mesh network.

The Bluetooth device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the Bluetooth device 10 to perform the functions described herein. This memory device 25 may be a non-volatile memory, such as a FLASH ROM, an electrically erasable ROM or other suitable devices. In other embodiments, the memory device may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2A. The second computer readable non-transitory media may be a CDROM, or a different memory device, which is located remote from the Bluetooth device 10. The instructions contained on this second computer readable non-transitory media may be downloaded onto the memory device 25 to allow execution of the instructions by the Bluetooth device 10.

The Bluetooth device 10 also includes a Bluetooth network interface 30 that connects with a Bluetooth network 100 using an antenna 35.

The Bluetooth device 10 may include a second memory device 40 in which data that is received and transmitted by the Bluetooth network interface 30 is stored. This second memory device 40 is traditionally a volatile memory. The processing unit 20 has the ability to read and write the second memory device 40 so as to communicate with the other devices in the Bluetooth network 100.

Although not shown, the Bluetooth device 10 also has a power supply, which may be a battery or a connection to a permanent power source, such as a wall outlet.

The Bluetooth device 10 may also include a sensor 50. The sensor may be a separate component, as shown in FIG. 2A, or may be integrated into other components. The sensor 50 may be used to measure incoming signal strength, RSSI (Received Signal Strength Indicator), temperature, movement, light intensity, humidity, or another parameter.

While the processing unit 20, the memory device 25, the Bluetooth network interface 30, the sensor 50 and the second memory device 40 are shown in FIG. 2A as separate components, it is understood that some or all of these components may be integrated into a single electronic component. Rather, FIG. 2A is used to illustrate the functionality of the Bluetooth device 10, not its physical configuration.

Figure 2B:
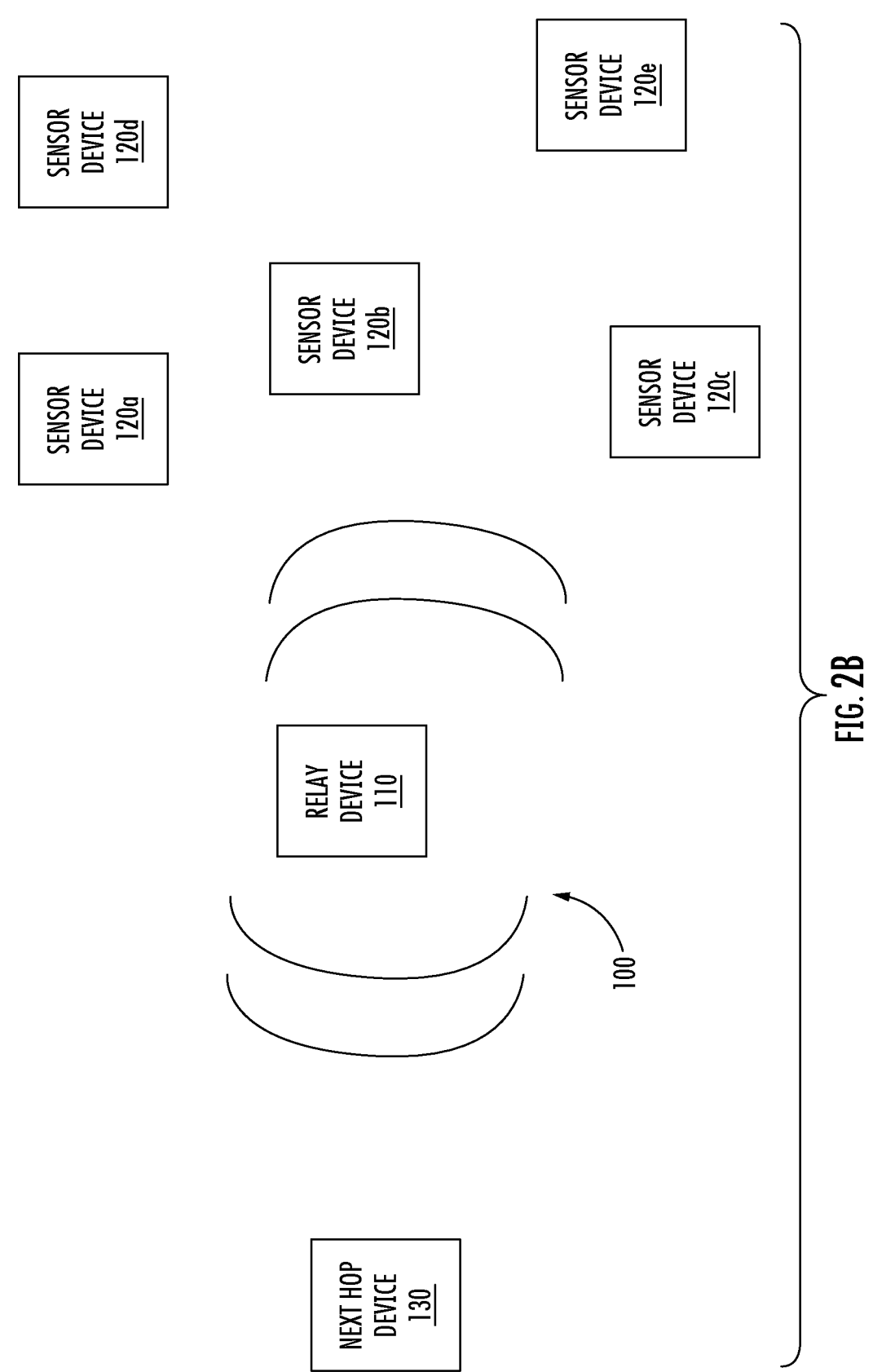
FIG. 2B shows a Bluetooth network including a central device, a relay device and multiple wireless sensor devices.

FIG. 2B shows a Bluetooth network 100 that includes a plurality of wireless sensor devices 120a-120e, all of which may have an architecture similar to that shown in FIG. 2A. This may be referred to as a wireless sensor network. The relay device 110 may also have a similar architecture. However, the processing power, memory capability and power requirements of the relay device 110 may be greater than that of the wireless sensor devices 120a-120e. Further, in some embodiments, the relay device 110 may not include a sensor 50. Note that communications between the relay device 110 and the wireless sensor devices 120a-120e may be performed wirelessly. The wireless sensor network may also include a next hop device 130. This device is logically located upstream from the relay device 110, such that the relay device 110 gathers sensor data from the wireless sensor devices 120a-120e, and transmits this data, either in its original form or in a compressed form, to the next hop device 130. The next hop device 130 may have an architecture similar to that of the relay device 110.

In this figure, relay device 110 may transmit a periodic advertisement to the wireless sensor device in the Bluetooth network 100. This periodic advertisement is received by the wireless sensor devices 120a-120e shown in FIG. 2B. The wireless sensor devices may each provide a response to this periodic advertisement in accordance with the protocol illustrated in FIGS. 1A-1B. After the relay device 110 receives the responses from the wireless sensor devices 120a-120e, it may forward this information, in its original form or in a compressed form, to the next hop device 130.

Figure 3A:
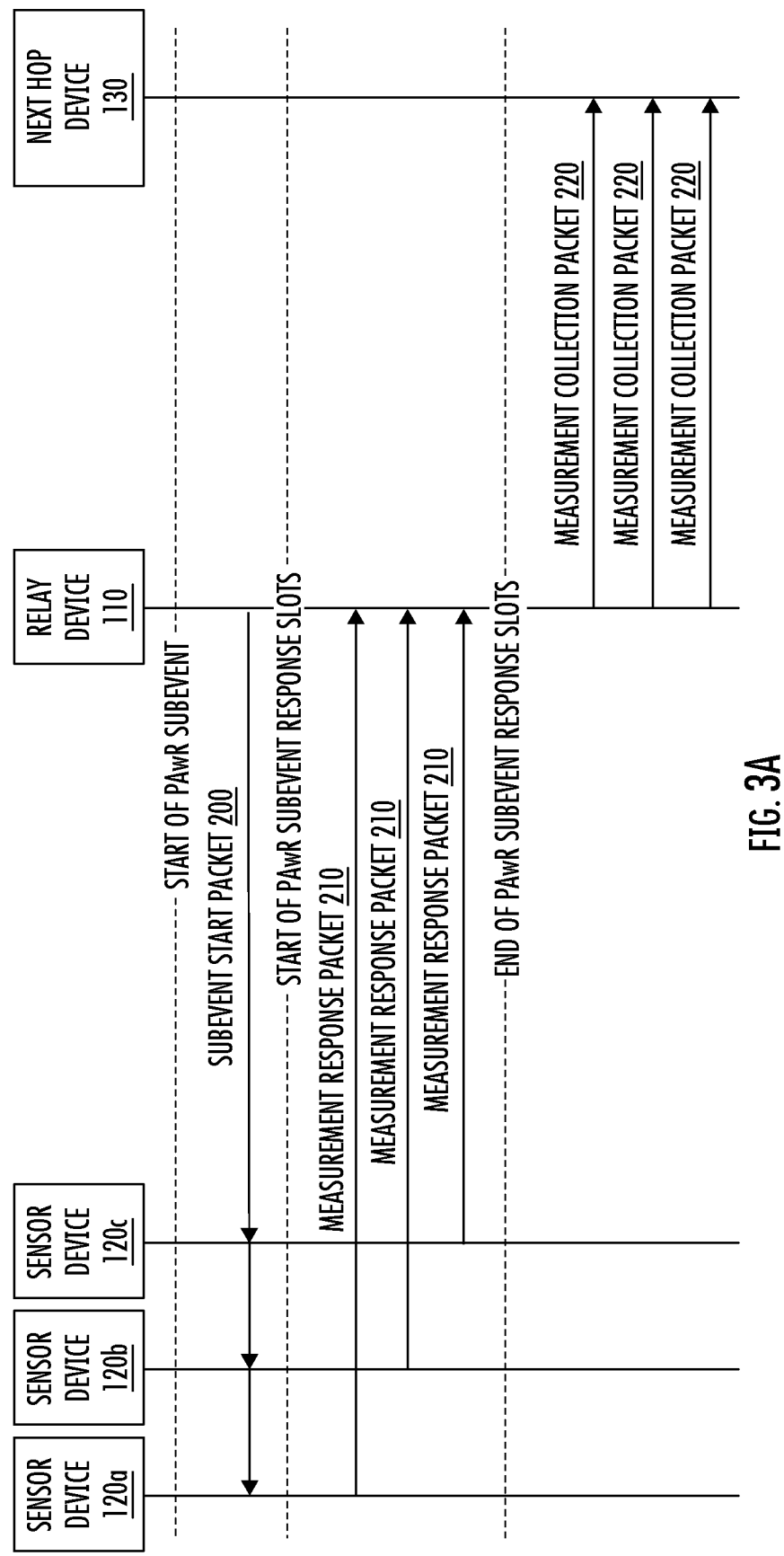
FIG. 3A-3B show timing diagrams illustrating the method of avoiding collisions among a plurality of wireless sensor devices according to two embodiments.

FIG. 3A shows a timing diagram which illustrates how sensor measurements are collected by the relay device 110 and forwarded to the next hop device 130 according to one embodiment. This figure only shows a subset of the wireless sensor devices. Note that the number of wireless sensor devices is not limited by this disclosure.

First, the relay device 110 transmits a packet at the start of the subevent, referred to as a subevent start packet 200, which is a part of a periodic advertisement. This subevent start packet 200 may be in the form of an AUX_SYNC-_SUBEVENT_IND PDU. This subevent start packet 200 is received by the wireless sensor devices 120a, 120b, 120c. This subevent start packet 200 may include information regarding measurement that is being requested. For example, the subevent start packet 200 may include a Sensor Get message, which contains a property ID, which indicates the type of sensor data that is being requested. This field may be populated with the specific type of sensor data being requested by the relay device 110, or may be defined as a wildcard, indicating that all types of sensor data are requested. Alternatively, the subevent start packet 200 may contain no relevant information. In this case, the wireless sensor devices 120a-120c may assume that all types of sensor data are being requested.

During their respective response slots, each wireless sensor device 120a-120c transmits their respective measurement data. The wireless sensor device embeds the measurement data within a Sensor Status message. The Sensor Status message may be in the form of a network PDU. The Sensor Status message is then embedded within a measurement response packet 210. The measurement response packet 210 may be in the form of an AUX_SYNC_SUBEVENT_RSP PDU. Each wireless sensor device 120a-120c then transmits its measurement response packet 210 during its allocated response slot.

Note that if there are a large number of wireless sensor devices, all of the response slots may not be contained within a single subevent interval. In this case, the relay device 110 may transmit multiple subevent start packets 200, wherein each wireless sensor device has an allocated subevent and response slot.

All of the measurement response packets 210 are collected by the relay device 110 and the Sensor Status messages are extracted from the measurement response packets 210 by the relay device 110. After the responses have been received, the relay device 110 then forwards the measurement data to a next hop device 130. This next hop device 130 may be the ultimate destination of the measurement data, or may be an intermediate node. The relay device 110 may transmit this measurement data to the next hop device 130 using a plurality of measurement collection packets 220. In certain embodiments, the relay device 110 wraps the original Sensor Status message from the measurement response packet 210 into the measurement collection packet 220. The measurement collection packets 220 may be in the form of ADV_NON_CONN_IND PDUs. In other words, in certain embodiments, the measurement collection packets 220 and the corresponding measurement response packets 210 each contain the same Sensor Status message that was created by the wireless sensor devices 120a-120c. Thus, the measurement collection packets 220 are generated based on information contained in the measurement response packets 210.

The relay device 110 may transmit the measurement collection packets 220 at such time as to avoid collisions. Thus, in certain embodiments, the relay device 110 transmits the measurement collection packets 220 outside of the period of time when response slots are scheduled.

Thus, in this embodiment, the relay device 110 utilizes periodic advertisements with responses to minimize the collisions that occur when the wireless sensor devices 120a-120e transmitting their measurement data. The relay device 110 then utilizes conventional packets to forward the measurement data to the next hop device 130. The packets transmitted to the next hop device 130 may be directed packets, indicating that they have a specific destination (which may be the collector device), or flood packets. Note that in scenarios where the relay device 110 is the collection device, there is no need to create or forward the measurement collection packets 220. Rather, the relay device 110 simply processes the information from the measurement packets.

Figure 3B:
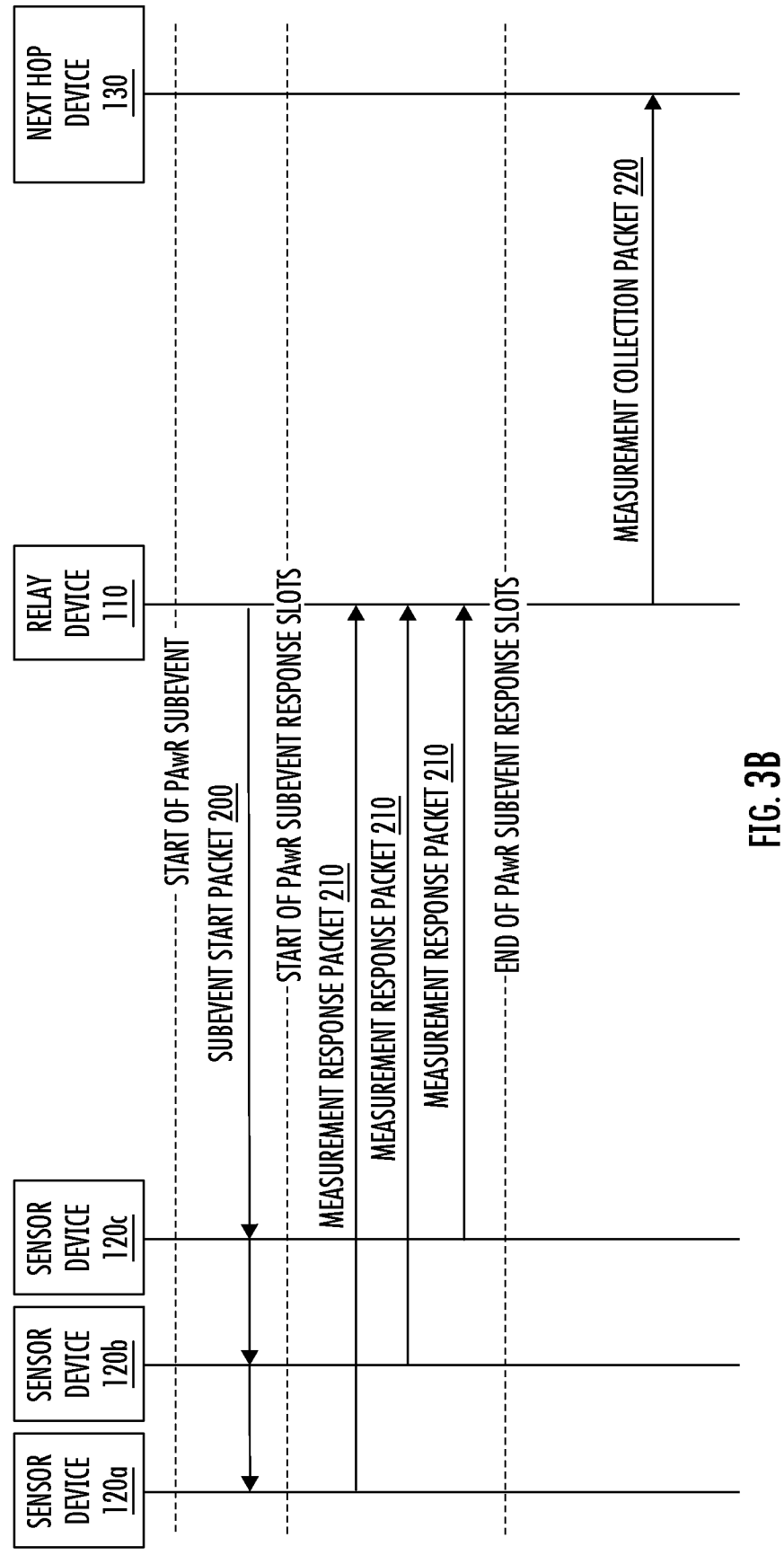

FIG. 3B shows a second embodiment. In this embodiment, the relay device 110 performs some processing of the measurement data from the wireless sensor devices 120a-120e prior to transmitting the measurement collection packets 220.

As described above, each subevent begins with the transmission of a subevent start packet 200 from the relay device 110. In this embodiment, the subevent start packet 200 may include a Sensor Get message, which contains a property ID, which indicates the type of sensor data that is being requested.

As described in FIG. 3A, during their respective response slots, each wireless sensor device 120a-120c transmits their respective measurement data. The wireless sensor device embeds the measurement data within a Sensor Status message. The Sensor Status message may be in the form of a network PDU. The Sensor Status message is then embedded within a measurement response packet 210. The measurement response packet 210 may be in the form of an AUX_SYNC_SUBEVENT_RSP PDU. Each wireless sensor device 120a-120c then transmits its measurement response packet 210 during its allocated response slot. All of the measurement response packets 210 are collected by the relay device 110 and the Sensor Status messages are extracted from the measurement response packets 210 by the relay device 110.

Next, the relay device 110 then processes all of the Sensor Status messages, as described in more detail below. In one embodiment, the relay device 110 may create a triplet that may be in the form of (Length, Address, Sensor Data), where address is the address of the wireless sensor device that transmits the Sensor Status message, the sensor data is the contents of the Sensor Status message and the length is the combined length of the Address and Sensor Data fields.

The relay device 110 may then compact all of the address information into a more compact format. For example, in some embodiments, the address of each wireless sensor device occupies bits of information, and is therefore in the range from 1 to 32,767. Thus, in one embodiment, the most significant bit is used to denote that another address follows the current one and is referred to as the continuation bit. In other words, the address 1024 may be written as x0400. However, if followed by another address, the address 1024 may be written as x8400.

The use of the continuation bit allows the representation of a plurality of addresses as a string. For example, assume that Sensor Status messages were obtained from addresses 1024, 1025, 1026, and 1028. These five addresses can be expressed as a string containing the following: x8400, x8401, x8402, and x0404. Note that the byte order may be different if little endian byte ordering is used. Note that this compaction produces a string that is equal to the number of addresses, multiplied by the number of bytes per address. This may be referred to as address array compacting.

As an alternative, the relay device 110 may compact the addresses by expressing them as a range. In one embodiment, the address range may be expressed as a starting address, an ending address, and a bit map that signifies which addresses in that range are present. The bit map may be one byte, two bytes, three bytes or more, depending on the size of the address range. For example, the relay device 110 may determine the number of bytes needed for the bit map based on the difference between the starting address and the ending address. For example, if the difference between the two addresses is 20, the bit map would need to be at least three bytes (computed as the smallest number that is greater than or equal to (ending address-starting address)/8). In the previous example, the address range is 1024 through 1028, with 1027 omitted. This may be expressed as x0400, x404, x01D, wherein 0x1D represents the bit pattern 00011101. Thus, in this embodiment, the address field is a string that is equal to twice the number of bytes per address plus at least one additional byte for the bit map. This may be referred to as address range compacting.

Thus, there are at least two ways in which the address information may be compacted.

The sensor data may also be compacted in a variety of different ways. Each Sensor Status message received from the wireless sensor devices 120a-120e provides the following information in its payload:

| Field | Size (bits) | Notes |
|---|---|---|
| Format | 1 | Format A or Format B |
| Length | 4 or 7 | 4 bits for Format A or 7 bits for Format B |
| Property ID | 11 or 16 | 11 bits for Format A or 16 bits for Format B |
| Measurement Value | 8*Length | Length field is in bytes |

In one embodiment, the information for multiple wireless sensor devices is simply concatenated together to create the payload for the measurement collection packet 220. Thus, in this embodiment, the sensor data payload for the measurement collection packet 220 is equal to the length of the payloads in all of the Sensor Status messages that are being concatenated. Note that this approach is applicable for Format A and Format B.

In another embodiment, the wireless sensor devices 120a-120e may all provide the same type of measurement (which is provided in the Property ID Field) and may all provide sensor data having the same length. In this embodiment, it is not necessary to repeat the format, length, and Property ID fields for each Sensor Status message. Rather, these fields may be defined once and the remainder of the payload may simply be the data associated with each sensor. Thus, the format of the sensor data in this embodiment can be expressed as follows:

| Field | Size (bits) | Notes |
|---|---|---|
| Format | 1 | Format A or Format B |
| Length | 4 or 7 | 4 bits for Format A or 7 bits for Format B |
| Property ID | 11 or 16 | 11 bits for Format A or 16 bits for Format B |
| Measurement Value 1 | 8*Length | Length field is in bytes |
| Measurement Value 2 | 8*Length | |
| . . . | 8*Length | |
| Measurement Value N | 8*Length | |

Thus, when all of the sensor data is provided in the same format, the overhead associated with the sensor data may be reduced by simply providing the format, length and Property ID information once for a plurality of measurements. Note that this approach is applicable for Format A and Format B and may be referred to as the first compacted data format.

Further, in some embodiments, the measurement values may not be an integral number of bytes. For example, a motion sensor may have a Boolean output, where the measurement is either 1 for motion or 0 for lack of motion. In this embodiment, the payload of the measurement collection packet 220 may be as follows:

| Field | Size (bits) | Notes |
|---|---|---|
| Bitlength | 5 | Can represent values between 1 and 31 bits |
| Property ID | 11 | This approach only applies to Format A |
| Measurement Value 1 | Bitlength | |
| Measurement Value 2 | Bitlength | |
| . . . | Bitlength | |
| Measurement Value N | Bitlength | |

Thus, when all of the sensor data is provided in the same format with a length of 31 bits or less, the overhead associated with the sensor data may be reduced by simply providing the bit length and Property ID information once for a plurality of measurements. Note that this approach is applicable only for Format A and may be referred to as the second compacted data format.

This disclosure provides several possible ways to compact the measurement collection packet 220. These are as follows:

| Address Compaction | Data Compaction |
|---|---|
| Address Array | Data array |
| Address Range | Data array |
| Address Array | First compacted data format (Format A) |
| Address Array | First compacted data format (Format B) |
| Address Range | First compacted data format (Format A) |
| Address Range | First compacted data format (Format B) |
| Address Array | Second compacted data format (Format A) |
| Address Range | Second compacted data format (Format A) |

Note that other methods of compacting the address and data may also be used. In some embodiments, the relay device 110 transmits a packet to the next hop device 130 indicating which of these combinations will be used in the measurement collection packet 220. In certain embodiments, that indication may be provided in the measurement collection packet 220.

As described above, the relay device 110 may transmit the measurement collection packet 220 at a time when the wireless sensor devices are not transmitting, such as after the last response slot.

Figure 4:
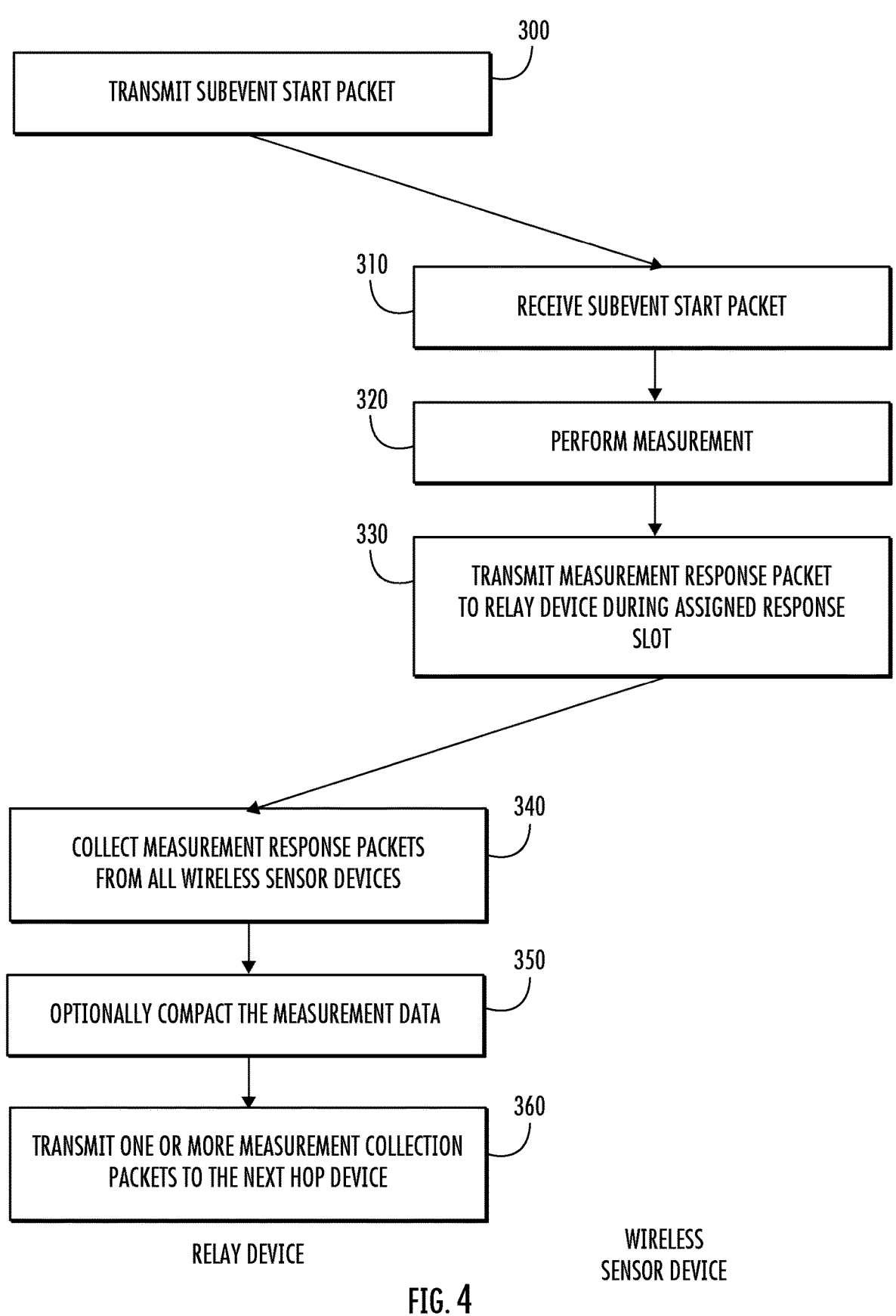
FIG. 4 shows a flowchart that may be executed by the relay device and a wireless sensor device in the Bluetooth wireless sensor network.

FIG. 4 summarizes the operations of the wireless sensor device and the relay device 110 as described above. First, as shown in Box 300, the relay device 110 transmits a subevent start packet 200. As noted above, this subevent start packet may include a Sensor Get message in some embodiments. In other embodiments, no information may be provided by the subevent start packet 200. As shown in Box 310, the plurality of wireless sensor devices receive the subevent start packet 200.

The wireless sensor devices perform the requested measurement, as shown in Box 320. In Box 330, each wireless sensor device transmits a measurement response packet 210 to the relay device 110 during its assigned response slot.

The relay device 110 receives all of the measurement response packets 210, as shown in Box 340. Optionally, as described with respect to FIG. 3B, the relay device compacts the measurement data, as shown in Box 350. The compacted measurement data is used to create the measurement collection packets. In embodiments where compaction is not performed, the measurement collection packets are created from the measurement response packets.

Finally, as shown in Box 360, the relay device 110 transmits one or more measurement collection packets 220 to the next hop device 130.

The present system and method have many advantages.

In both embodiments, the use of periodic advertisements with responses allows each wireless sensor device to transmit its measurement data at a time when no other wireless sensor devices should be transmitting. This reduces the possibility of collisions and improves overall data bandwidth and throughput. Further, the relay device 110 forwards the measurement collection packets 220 at a time when the wireless sensor devices are not transmitting, further reducing the chance of data collision.

The embodiment of FIG. 3B offers additional advantages. For example, by compacting the address and data, protocol overhead may be reduced. Further, when non-standard long access messages on top of extended advertising are used, the protocol overhead reduction is even greater. As an example, assume that there are five wireless sensor devices that are occupancy sensors. As such, their measurement data is Boolean; either there are people present or there are no people present. Using the standard Mesh protocol, the Sensor Status message for each of these wireless sensor devices would be 22 bytes. Therefore, the measurement response packets from the five wireless sensor device would have a total of 110 bytes. Using the embodiment of FIG. 3A, the measurement collection packet 220 would include a network PDU that contains these 110 bytes. However, using the embodiment of FIG. 3B, the relay device 110 may compact the address and the data and generate a compacted network PDU of only 30 bytes. Thus, the bandwidth required is greatly reduced.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of reducing data collisions in a Bluetooth wireless sensor network, wherein the Bluetooth wireless sensor network utilizes periodic advertisements with responses, wherein each of a plurality of wireless sensor devices in the Bluetooth wireless sensor network is assigned a response slot, the method comprising:

wirelessly transmitting, from a relay device, at least one subevent start packet, wherein the at least one subevent start packet is an AUX_SYNC_SUBEVENT_IND PDU that includes a Sensor Get message and an indication of a type of sensor data requested;

receiving, at the plurality of wireless sensor devices, the at least one subevent start packet;

performing, at each of the plurality of wireless sensor devices, a measurement to obtain measurement data;

transmitting measurement response packets from each of the plurality of wireless sensor devices to the relay device during a respective assigned response slot, wherein the measurement response packet includes a Sensor Status message, contained within an AUX_SYNC_SUBEVENT_RSP Protocol Data Unit (PDU) which contains the measurement data; and receiving, at the relay device, the measurement response packets from the plurality of wireless sensor devices.

2. The method of claim 1, further comprising:

generating, at the relay device, one or more measurement collection packets using information from the measurement response packets; and transmitting the one or more measurement collection packets from the relay device to a next hop device.

3. The method of claim 2, further comprising compacting addresses of the wireless sensor devices, at the relay device, in the one or more measurement collection packets.

4. The method of claim 3, wherein compacting of the addresses comprises creating an array of addresses.

5. The method of claim 3, wherein compacting of the addresses comprises creating an address range.

6. The method of claim 2, wherein the Sensor Status message contains a format, a Property ID (which is an identifier), a length and the measurement data, and further comprising compacting the measurement data received from the wireless sensor devices at the relay device, in the one or more measurement collection packets.

7. The method of claim 6, wherein compacting the measurement data comprises creating a data array, each element of the data array associated with one of the plurality of wireless sensor devices; wherein each element comprises the format, the Property ID, the length and the measurement data associated with a respective wireless sensor device.

8. The method of claim 6, wherein all Sensor Status messages have a same format, length and Property ID, and wherein compacting the measurement data comprises creating a compacted data array, comprising a header including the format, the Property ID, the length and a data array comprising the measurement data from each wireless sensor device.

9. The method of claim 6, wherein all Sensor Status messages have a same format, length and Property ID, and wherein compacting the measurement data comprises creating a compacted data array, comprising a header including a bitlength and the Property ID, and a data array comprising the measurement data from each wireless sensor device.

10. A Bluetooth wireless sensor network, wherein the Bluetooth wireless sensor network utilizes periodic advertisements with responses, comprising:

a plurality of wireless sensor devices; and a relay device; wherein the relay device transmits at least one subevent start packet; and wherein each of the plurality of wireless sensor devices receives the at least one subevent start packet, performs a measurement to obtain measurement data and transmits a measurement response packet to the relay device during a respective assigned response slot measurement response packet, wherein the measurement response packet includes a Sensor Status message, contained within an AUX_SYNC_SUB- EVENT_RSP Protocol Data Unit (PDU), wherein the Sensor Status message contains a format, a Property ID (which is an identifier), a length and the measurement data; and wherein the relay device compacts the measurement data received from the wireless sensor devices in one or more measurement collection packets.

11. The Bluetooth wireless sensor network of claim 10, further comprising a next hop device; wherein the relay device receives a plurality of measurement response packets from the plurality of wireless sensor devices, and transmits one or more measurement collection packets to the next hop device.

12. The Bluetooth wireless sensor network of claim 11, wherein the relay device compacts addresses of the plurality of wireless sensor devices in the one or more measurement collection packets.

13. The Bluetooth wireless sensor network of claim 10, wherein the relay device creates a compacted data array, comprising a header including the format, the Property ID, the length and a data array comprising the measurement data from each wireless sensor device.

14. The Bluetooth wireless sensor network of claim 10, wherein the relay device creates a compacted data array, comprising a header including a bitlength and the Property ID, and a data array comprising the measurement data from each wireless sensor device.

15. A method of reducing data collisions in a Bluetooth wireless sensor network, wherein the Bluetooth wireless sensor network utilizes periodic advertisements with responses, wherein each of a plurality of wireless sensor devices in the Bluetooth wireless sensor network is assigned a response slot, the method comprising:

wirelessly transmitting, from a relay device, at least one subevent start packet;

receiving, at the plurality of wireless sensor devices, the at least one subevent start packet;

performing, at each of the plurality of wireless sensor devices, a measurement to obtain measurement data;

transmitting measurement response packets from each of the plurality of wireless sensor devices to the relay device during a respective assigned response slot, wherein the measurement response packet includes a Sensor Status message, contained within an AUX_SYNC_SUBEVENT_RSP Protocol Data Unit (PDU) which contains the measurement data, wherein the Sensor Status message further contains a format, a Property ID (which is an identifier), and a length;

receiving, at the relay device, the measurement response packets from the plurality of wireless sensor devices;

compacting, at the relay device, the measurement data received from the plurality of wireless sensor devices in one or more measurement collection packets; and transmitting the one or more measurement collection packets from the relay device to a next hop device.

16. The method of claim 15, wherein compacting the measurement data comprises creating a data array, each element of the data array associated with one of the plurality of wireless sensor devices; wherein each element comprises the format, the Property ID, the length and the measurement data associated with a respect wireless sensor device.

17. The method of claim 15, wherein all Sensor Status messages have a same format, length and Property ID, and wherein compacting the measurement data comprises creating a compacted data array, comprising a header including the format, the Property ID, the length and a data array comprising the measurement data from each wireless sensor device.

18. The method of claim 15, wherein all Sensor Status messages have a same format, length and Property ID, and wherein compacting the measurement data comprises creating a compacted data array, comprising a header including a bitlength and the Property ID, and a data array comprising the measurement data from each wireless sensor device.

\* \* \* \* \*